United States Patent [19]

Schoenholz et al.

[11] 3,808,051

[45] Apr. 30, 1974

[54] CLEANING METHOD AND COMPOSITIONS

[75] Inventors: Daniel Schoenholz, Basking Ridge; Arthur Walter Petersen, Florham Park; Marcus Allen Northyp, Jr., Morristown, all of N.J.

[73] Assignee: Church & Dwight Co., Inc., Syracuse, N.Y.

[22] Filed: May 17, 1973

[21] Appl. No.: 361,140

Related U.S. Application Data

[63] Continuation-in-part of Ser. No. 265,639, June 23, 1972, abandoned.

[52] U.S. Cl.............................. 134/2, 134/19, 134/28, 134/38, 134/40, 252/156
[51] Int. Cl.............................................. C23g 1/00
[58] Field of Search........... 134/2, 5, 19, 20, 39, 40, 134/28, 38; 252/156

[56] References Cited
UNITED STATES PATENTS
2,992,995   7/1961   Arden................................. 134/39

*Primary Examiner*—Morris O. Wolk
*Assistant Examiner*—Dale Lovercheck
*Attorney, Agent, or Firm*—Hammond & Littell

[57] ABSTRACT

A cleaning composition for the removal of soils containing free or combined organic acids comprising (A) at least 1 percent by weight of a substance selected from the group consisting of (1) at least one alkali metal salt of a weak organic acid, said salt melting at elevated temperatures, preferably below about 550°F and said weal organic acid constituent part being volatile and/or decomposing at said elevated temperatures on contact with said soil or (2) mixtures of salts thereof, the mixtures having melting points lower than the cleaning temperature, preferably less than 550°F; and (B) up to 99 percent by weight of a carrier. The novel method of cleaning soils containing free or combined organic acids comprises applying the said salt or salts of weak organic acid to said soil, heating the salt(s) and soil above the melting point of the said salt(s) and then removing the residue.

10 Claims, No Drawings

CLEANING METHOD AND COMPOSITIONS

PRIOR APPLICATION

This application is a continuation-in-part of our co-pending, commonly assigned application Ser. No. 265,639 filed June 23, 1972, now abandoned.

STATE OF THE ART

The removal of soils containing free or combined organic acids from hard surfaces such as metal or ceramics has received much study. This type of soil occurs as a varnish on engine parts or as soil in ovens, baking pans, barbecue racks, etc. The organic acid in the soil is usually in the form of the free acid or as easily saponifiable esters there-of.

Oven interiors soiled by baked-on grease and splattered food stuffs have been cleaned by applying to the soiled interiors solutions containing saponification agents, catalytic metal salts and oxides, as well as ammonia producing compounds, either preceded or followed by heating of the soiled interiors in order to cause a chemical reaction with the soiling agent. For example see U.S. Pat. Nos. 3,549,419; 3,031,408; 3,031,409; 3,079,284; 3,196,046; 3,331,943 or 3,335,092. However, there are certain difficulties associated with the use of the above solutions, such as harsh fumes emanating from the oven which are harmful to the eyes and on contact can produce skin damage. These solutions if accidently spilled during usage are capable of producing corrosion damage to floors, painted surfaces, chrome, aluminum, etc.

It has also been suggested to utilize liquid silicone preparations on clean oven walls to keep food residues from sticking, and/or to make any residues easier to wash out after use as can be seen in U.S. Pat. Nos. 3,303,052; 3,196,027; and 3,183,110. The difficulty herein is that these preparations are only effective if applied to a clean oven before the walls become soiled, and they are not effective for cleaning the walls once they have become soiled.

Ovens having catalytic oven liners intended to be continuously self-cleaning at normal use temperatures below 600°F are also known as described in U.S. Pat. Nos. 3,460,523 and 3,266,477. Another proposal has been to design ovens for self-cleaning with auxiliary heaters intended to raise to oven temperature to about 900°C to burn off spilled food stuffs. It has also been proposed to equip such ovens with catalytic after burners to consume smoke generated during cleaning as in U.S. Pat. Nos. 3,428,434; 3,428,435; and 3,423,568. These devices are not without certain difficulties in that they will sometimes emit smoke if major spills are not wiped up before heating to the cleaning temperature range. Furthermore, it is necessary to resort to oven temperatures much higher than normally used in order for the self-cleaning device to become operable.

OBJECTS OF THE INVENTION

It is an object of the invention to provide novel cleaning compositions for the removal of soil containing free or combined organic acids from surfaces wherein the active ingredient is at least one alkali metal salt of a weak organic acid melting at relatively low temperatures.

It is a further object of the invention to provide a low temperature method of removing soil containing free or combined organic acids from surfaces.

It is another object of the invention to provide novel compositions and method for cleaning ovens at normal operating temperatures without corrosive materials and toxic or irritating fumes.

These and other objects and advantages of the invention will become obvious from the following detailed description.

THE INVENTION

The novel method of the invention for the removal of soil containing free or combined organic acids from a surface comprises applying to a surface having a soil containing free or combined organic acids thereon an effective amount of at least one alkali metal salt of a weak organic acid, heating the said treated surface to a temperature above the melting point of the said alkali metal salts and at a temperature at which the weak organic acid moiety will volatilize and/or decompose and removing the soil residue from the soil surface.

It is essential for the coated surface to be heated to a high enough temperature to melt the alkali metal salt or its mixtures, probably to ensure good contact between the soil and the salt and to provide energy for the dissociation of the salt. It is theorized that the alkali metal ions react with the organic acid or its easily saponifiable esters to form the alkali metal salts of the organic acid in the soil which is then easily removed. The heating temperature must also be high enough to volatilize and/or decompose the weak organic acid so that the said acid will be removed to liberate the alkali metal ions for reaction with the organic acid in the soil.

The upper temperature limit may vary within a wide range but for oven cleaning it is preferred to operate at temperatures between 250° to 550°F. The upper limit is the normal upper temperature limit of conventional ovens and the lower limit is governed by the melting point of the particular alkali metal salts.

The method of the invention may be used for cleaning ovens or other heat resistant objects such as kitchen or oven utensils made of heat resistant glass, ceramic materials, porcelain enamelled metal, aluminum, stainless steel or chromium plated metals as well as for cleaning engine parts soiled with various gum-like or varnish like deposits. The method can also be used to remove undesired surface coatings from metallic objects and more particularly surface coatings containing common film forming agents such as drying oils, shellac and polyurethanes.

The alkali metal salts used in the method may be salts of weak organic acids which melt within the desired range or mixtures of alkali metal salts which melt within the desired range whether or not the individual salts will melt therein. Examples of suitable alkali metal salts of weak organic acids are aliphatic and alicyclic carboxylic acids of one to 10 carbon atoms, preferably of one to seven carbon atoms. The alkali metal may be any of the known alkali metals but preferably sodium, potassium and/or lithium and eutectic mixtures thereof.

Examples of specific salts are alkali metal formates such as sodium formate; alkali metal glycolates such as sodium glycolate; alkali metal glycinates such as sodium glycinate; sodium adipate, sodium tartrate, potassium tartrate, Rochelle salt (sodium potassium tartrate) and alkali metal acetates such as sodium acetate, potassium acetate and lithium acetate and binary and ternary mixtures thereof.

In a preferred embodiment, the salt mixtures are binary or ternary mixtures of the alkali metal salts of weak acids such as alkali metal acetates, preferably lithium acetate, sodium acetate and potassium acetate and these mixtures may optionally contain alkali metal salts of weak acids which will lower the melting point of the mixtures even further, such as alkali metal acetate mixtures containing an alkali metal glycolate, an alkali metal gluconate, an alkali metal glycinate, or an alkali metal formate, preferably sodium glycolate, sodium glycinate, or sodium formate.

In a preferred embodiment, sodium glycolate or sodium glycinate are added to mixtures of alkali metal acetates and each has the effect of lowering the melting point 5 to 10 percent and of slightly speeding up the cleaning at the lower temperatures.

The novel cleaning compositions of the invention for soil containing free or combined organic acids are comprised of (A) 1 to 99 percent by weight of an active ingredient consisting of at least one alkali metal salt of a weak organic acid which salt will melt at elevated temperatures and said weak organic acid will volatilize and/or decompose at said elevated temperatures and (B) 99 to 1 percent by weight of a carrier. Preferably, the active ingredient will melt between 250° and 550°F and the weak organic acid moiety will volatilize in the same temperature range to be effective as an oven cleaner.

The compositions of the invention have the advantage over the prior art cleaning compositions in that they are nonhazardous. They are safe to handle as they do not produce skin irration or noxious fumes and will not cause damage to kitchen surfaces as they are not strongly alkaline.

The preferred cleaning compositions are those where the active ingredient is a binary or ternary mixture of alkali metal salts of acetic acid, preferably lithium, potassium and sodium acetate mixtures. The mixtures with the lowest melting point are desired as this means lower cleaning temperatures may be used.

The physical form of the compositions may vary considerably depending upon whether the composition is to be utilized as a paste, liquid, or aerosol.

Dry preparations are effective by themselves if the material will remain in contact with the soiled substrate. However, thickened solutions or suspensions of the salt which can be applied by brush or solutions packaged in aerosol containers and applied by spraying are preferred for application to overhead or vertical surfaces.

The concentrations of the salt in the paste, liquid or aerosol preparations may be low as 1 per cent by weight based upon the total weight. The maximum salt concentration is only limited by the solubility or dispersibility of the salts being used. There may be up to 99 percent by weight based upon the total weight of a carrier. Aqueous carriers or water and water-miscible organic solvent mixtures are preferred.

In a modification of the invention, polyhydric alcohols containing at least 2 free hydroxy groups may be added to the compositions. Examples of suitable polyhydric alcohols are ethylene glycol, diethylene glycol, triethylene glycol, glycerol, diglycerol, triglycerol, monoacetin, pentaerythritol, sorbitol and mannitol. These compositions have an enhanced cleaning action and preferably contain 10 to 100 percent by weight of polyhydric alcohol based on the weight of the alkali metal salt contained in the composition.

Any thickening agent compatible with the salt or salt mixture may be used. Some useful organic agents are starch, sodium carboxymethycellulose, hydroxyethyl cellulose, methocel, and water-soluble polymers such as carboxy vinyl polymer (Carbopols from B. F. Goodrich Chemical Company) and most preferred are Xanthan gums. Inorganic colloidal materials such as Veegum (magnesium aluminum silicates manufactured by R. T. Vanderbilt) are also effective.

When utilizing Carbopol as a thickening agent for an alkali metal acetate mixture, it is preferred that there be at least 5 percent of the acetates with 1 percent or more Carbopol for proper thickening to adhere to vertical surfaces and on the underside surface of the oven roof. When utilizing Veegum dispersions as a thickening agent for an alkali metal acetate mixture, it is preferred that there be 3 to 4 percent Veegum for proper thickening to adhere to vertical surfaces and on the underside surface of the oven roof.

It may also be preferable to have present as a component of the solutions a minor amount of surface active agent which will cause the solution to spread evenly over the soiled surface, or to form a foam. The surface active agents can be any of those commonly known and used as such. An extensive list of such agents appears in the publication McCutcheon's Detergents and Emulsifiers, 1972 Annual. The agents can be anionic, cationic, nonionic or amphoteric and should be compatible with the other ingredients and impart the desired surface active properties.

Examples of anionic surfactants include (a) carboxylic acids such as soaps of straight chained naturally occuring fatty acids, chain-substituted derivatives of fatty acids, branched-chain and odd-carbon fatty acids, acids from paraffin oxidation, and carboxylic acids with intermediate linkages; (b) sulfuric esters such as sodium lauryl sulfate, tallow alcohol sulfates and coconut alcohol sulfates.

Examples of cationic surfactants include (a) non-quaternary nitrogen bases such as amines without intermediate linkages, and (b) quaternary nitrogen bases of the formula

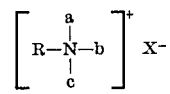

wherein R is a straight-chain alkyl of 12 to 19 carbon atoms, wherein a, b and c are methyl, ethyl or benzyl (usually not more than one benzyl group being present), and wherein X is halide such as chloride, bromide or iodide, methylsulfate or ethylsulfate and quaternary ammonium salts such as Hyamine 10X (diisobuty cresoxy ethoxyethyl dimethylbenzyl ammonium chloride monohydrate).

Examples of nonionic surfactants include polyethyleneoxy ethers of alkylphenols, alkanols, mercaptans, esters as well as polyethyleneoxy compounds with amide links.

It is also preferable to have suspended in the compositions of the invention a finely divided substance to aid in keeping the cleaner spread evenly over the surface as the temperature rises and the active cleaning salts become molten. Many of the active cleaning materials have a tendency when molten and rendered fluid by high temperatures to either drain off the oven walls or to contract into puddles leaving portions of the soiled surface uncovered by the cleaning agent. It has been found that certain of the organic thickening agents which may be incorporated to control flow during initial application of the composition and which are effective for the purpose at room temperature tend to lose their thickening ability at elevated temperatures so that a heat stable auxiliary thickening and flow control agent is desirable. The amount of such finely divided material may range from 1 to 60 percent by weight of the aqueous cleaner composition but is perferably between 2 percent and 10 percent for use in the form of aerosols. For paste compositions, the finely divided material may range from about 1.0 to 8.0 times the weight of active cleaning salts but is preferably between one and four times the weight of the active salts. Examples of finely divided inorganic materials include precipitated calcium carbonate, silica, feldspar, clay and talc.

It has been found that the use of alkaline finely divided materials such as alkaline earth metal carbonates, has the added advantage that they will react and/or absorb the volatile acid to avoid any minor amounts of acid in the atmosphere. Particularly preferred is calcite.

A preferred composition is an aerosol composition for oven cleaning comprising 1 to 45 percent, preferably 5 to 15 percent by weight of a eutectic mixture of sodium acetate, lithium acetate and potassium acetate, an aqueous carrier, a thickening agent and an aerosol propellant under pressure.

In the following examples there are described several preferred embodiments to illustrate the invention. However, it should be understood that the invention is not intended to be limited to the specific embodiments.

EXAMPLE 1 a small amount of lard was melted and brushed in a thin layer onto a porcelain enamelled test tray which was then baked for 1 hour in an oven at 500°F. This baking converted the lard into a hard, brown, varnish-like material, similar in composition and appearance to the baked-on fatty residues that build up in household cooking ovens during repeated use.

An aqueous cleaning composition containing the following mixture of alkali metal salts of a weak organic acid was prepared. This salt mixture closely approximates the known eutectic consisting of 32, 41 and 27 mol percent of the anhydrous salts, respectively, and reported to melt at 315°F.

| Salt mixture | % Wt. |
|---|---|
| Lithium acetate, dihydrate | 34.4 |
| Potassium acetate, anhydrous | 42.3 |
| Sodium acetate, anhydrous | 23.3 |
| | 100.0 |

| Cleaning Composition | |
|---|---|
| Salt mixture | 10.00 |
| Water | 15.00 |
| "Snowflake" No. 301 Calcite (−325 mesh) | 6.00 |

-Continued

| Salt mixture | % Wt. |
|---|---|
| Xanthan gum (Biopolymer XB-23) | 0.20 |
| Dowfax 2A1 - solution (sodium dodecyl ether sulfonate an anionic) | 0.10 |
| Dowicide A (sodium salt of o-phenylphenol .4 H$_2$O) | 0.02 |
| Water | 68.68 |
| | 100.00 |

The salts were dissolved in the first 15 percent portion of water and the powdered calcite was stirred into this solution to form a smooth slurry. The Xanthan gum was added a little at a time to the second portion of 68.68 wt. percent of water and was stirred thereafter for 15 minutes to form a gel-free-colloidal dispersion in which the Dowfax 2A-1 and Dowcide A were dissolved. The two solutions were then combined with stirring to make the final cleaning composition.

Eighty-five percent by weight of this cleaning composition was placed in an ordinary aerosol can along with 15 percent by weight of a mixed fluorocarbon propellant. The can was fitted with a commercial valve and actuator button suitable for spraying the cleaning composition onto soiled surfaces in the form of a relatively thin, adherent foam. The cleaning composition was sprayed onto test trays coated with baked lard as described above and the sprayed trays were placed in an oven. They were then heated for 45 minutes to a final temperature of 425°F after which they were cooled and the residue was washed off with a wet sponge, resulting in 100 percent cleaning of the porcelain enameled surfaces of the trays.

EXAMPLE 2

A test mixture similar to one described in U.S. Pat. No. 3,549,419 and containing 32 wt percent cooking fats, 47 wt percent high protein foods, 18 wt percent high carbohydrates foods, and 3 percent condiments was liquefied in a Waring blender and thinned with one-third volume of water. This complex mixture of foodstuffs was brushed onto porcelain enamelled test trays and baked 1 hour at 525°F, giving a very rough, black coating which was considered to simulate a very bad oven spill such as might have been neglected by the housewife during several subsequent bakings.

The cleaning composition of Example 1 was sprayed onto the mixed food soil test trays which were then heated for 45 minutes at 410°F. On cooling and wiping with wet paper towels, about 35 percent of the carbonized mixed food soil was found to have been removed. A second application of the cleaner when heated to 500°F achieved 95 percent cleanliness.

For comparison purposes, the complex food mixture of Example II above was baked for 1 hour at 525°F producing the same coating as described therein. Several commercially available caustic based oven cleaners which, when applied to the coating that had been preheated to 200°F and held there for 15 minutes, gave the following results:

| Product | % Cleaned |
|---|---|
| Jifoam Aerosol | 5 – 10% |
| Dow Aerosol | 40% |
| Easy Off Aerosol | 20% |

| Product | % Cleaned |
|---|---|
| Easy Off Paste | 30% |

EXAMPLE 3

A portion of the cleaning composition of Example 1, instead of being packaged in an aerosol can, was simply brushed onto the test trays having a baked lard coating and was heated as in Example 1 from a cold start to 425°F during 45 minutes. The cleaning composition was also brushed onto one half of a shallow aluminum drip pan which had been used many times under a broiler until the aluminum had become coated with a heavy dark colored residue. This pan was heated along with the porcelain enamelled test tray. When cooled and wiped, the test tray was found to have been 100 percent cleaned and the treated half of the aluminum drip pan was both clean and uncorroded.

EXAMPLE 4

A cleaning composition was prepared as in Example 1 except that 10 percent by weight of the following binary salt mixture was used instead of 10 percent by weight of the ternary salt mixture in the cleaning composition of Example 1.

|  | % By Wt. |
|---|---|
| Potassium acetate, anhydrous | 59.4 |
| Sodium acetate, anhydrous | 40.6 |
|  | 100.0 |

This binary salt mixture closely approximates a known eutectic consisting of 55 mol percent of potassium acetate and 45 mol percent of sodium acetate and reported to melt at 442°F. This cleaning composition containing the binary salt mixture was brushed onto porcelain enamelled trays coated with baked lard as in Example 1. On heating the test trays in an oven for 30 minutes to 475°F, cooling, and wiping with a moistened cloth, the trays were found to have been 100 percent cleaned.

EXAMPLE 5

A cleaning composition was prepared from the following ingredients:

|  | % By Wt. |
|---|---|
| Potassium acetate, anhydrous | 11.9 |
| Sodium acetate, anhydrous | 8.1 |
| Potassium carbonate | 2.0 |
| Water | 78.0 |
|  | 100.0 |

The resulting substantially clear solution was brushed onto test trays coated with baked lard as in Example 1 and heated for 45 minutes to 415°F. The residue had a grey, slaglike appearance while still hot. On cooling and wiping as before, the enamel was found to have been completely cleaned and it was noted that the residue wiped off more easily than the residues from the previous example.

EXAMPLE 6

Cleaning compositions were prepared according to the following table in which proportions are shown as percent by weight:

|  | A | B |
|---|---|---|
| Sodium formate | — | 10.0 |
| Sodium glycolate | 10.0 | 10.0 |
| Tergitol 15-S-20 (polyethylene glycol ether of linear secondary alcohols – non-ionic) | 0.1 | 0.1 |
| Water | 89.9 | 79.9 |
|  | 100.0 | 100.0 |

Each of these solutions was brushed onto test trays coated with baked lard as in Example 1 and the trays were heated for 55 minutes to 410°F. The residues from each appeared melted when the oven was opened. On cooling and wiping with a wet sponge, both preparations were found to have cleaned off 98 percent to 100 percent of the baked lard soil.

EXAMPLE 7

The compositions listed below in percentages by weight were prepared by dissolving the soluble materials in the water and then stirring in powdered calcite to form a thin slurry:

|  | A | B | C |
|---|---|---|---|
| Ternary Acetate mixture of Example 1 | 15.0 | 15.0 | 12.0 |
| Sodium glycolate | — | 8.0 | — |
| Sodium glycinate | — | — | 6.0 |
| Snowflake No. 301 calcite (325 mesh) | 5.0 | 5.0 | 5.0 |
| Water | 80.0 | 72.0 | 77.0 |
|  | 100.0 | 100.0 | 100.0 |

Each of these solutions was brushed onto a lard coated test tray. The trays were heated in an oven to 400°F in 15 minutes and were held at that temperature for 30 minutes. On cooling and rinsing with water, solution A was found to have cleaned about 50 percent of the area with which it had been in contact whereas solutions B and C had each cleaned over 90 percent, showing that minor additions of soidium glycolate or sodium glycinate improve the cleaning action of the ternary acetate mixture when heated in the temperature range of 400°F.

EXAMPLE 8

Another cleaning composition was prepared by dissolving 15 parts by weight of the ternary acetate mixture of Example 1 and 15 parts by weight of diethylene glycol in 65 parts of water and then stirring in 5 parts of Snowflake No. 301, calcite. This slurry was brushed onto part of a porcelain test tray coated with baked lard and the remaining part of the same tray was brushed with composition A of Example 7. This tray was also heated to 400°F and held at that temperature for 30 minutes. On cooling and wiping with a wet paper towel, it was again found that solution A of Example 7 had cleaned only about 50 percent of its part of the test tray whereas the composition containing diethylene glycol had cleaned 85 percent of its area.

In a separate test, it was found that diethylene glycol is miscible with the ternary acetate mixture at temperatures in the neighborhood of 350°F. Since diethylene glycol is not chemically similar to the alkali metal salts of weak organic acids and would not, therefore, be expected to act by the same mechanism as they do, the enhancement of the cleaning action is believed due to ability to render their melts temporarily more fluid through solvent action, thus improving contact between the molten cleaning salts and the baked-on fatty soil.

EXAMPLE 9 cleaning mixtures were made using Carbopol carboxy polymethylene gums as thickeners instead of Xanthan gum. Carbopol gums when dispersed in water are acidic and are generally made alkaline by neutralizing with sodium hydroxide before use in alkaline compositions. Neutralization causes a marked increase in viscosity while additions of electrolytes such as the salts of this invention causes a degree of thinning of the neutralized gum. The following mixtures were prepared and tested both for consistency in application by brush and for cleaning ability, the proportions being in percentage by weight. Cleaning ability was tested on porcelain trays, one set coated with a medium brown, thin layer of baked lard, and the other with a darker, thicker and harder-baked coating. These test trays after brushing on the compositions below, were heated for 60 minutes at 475°F.

|  | A | B | C |
|---|---|---|---|
| Carbopol No. 941 (1% solution, pH 10.0) | 97.0 | 95.0 | 90.0 |
| Ternary acetate mixture of Example 1 | 3.0 | 5.0 | 10.0 |
|  | 100.0 | 100.0 | 100.0 |
|  | A | B | C |
| Brushing consistency | too thick | good | too thin |
| Cleaning |  |  |  |
| Medium baked lard soil | 100% | 100% | 100% |
| Dark baked lard soil | 60% | 85% | 100% |

A minimum of 5 percent by weight of the ternary acetate mixture is desirable to insure effective cleaning of varying types of fatty soils and 10 percent is preferable to provide a slight excess. From the above observations of brushing consistency, slightly more than 0.9 percent by weight of Carbopol is to be preferred when using a salt content of about 10 percent.

EXAMPLE 10

A cleaning composition containing Carbopol as a thickening agent and suitable for application as an aerosol was prepared as follows:

|  | Wt. % |
|---|---|
| Carbopol No. 940 (2.33% solution, pH 10.0) | 64.50 |
| Water | 10.00 |
| Ternary acetate mixture of Example 1 | 10.00 |
| Water | 9.38 |
| Miranol C2M-SF Conc. (disodium salt of a coconut fatty acid derivative-amphoteric) | 0.10 |
| Dowcide A | 0.02 |
| Snowflake No. 301 Calcite (325 mesh) | 6.00 |
|  | 100.00 |

The first three above ingredients were mixed together to form a solution and the remaining materials were mixed to form a smooth slurry which was then added with thorough stirring to the first solution. This preparation was filled into an aerosol can along with propellant as in Example 1 and was applied by spraying onto an enamelled test tray coated with baked lard. Upon heating for 45 minutes at 480°F, cooling, and rinsing with water, the tray was observed to be substantially clean.

EXAMPLE 11

Another solution of the cleaning salts was thickened with Veegum (a colloidal magnesium aluminum silicate). Veegum dispersions are the opposite of Carbopol since they get thicker on addition of electrolytes. Thin mixtures also tend to separate on long standing although somewhat thicker ones are more stable. The latter spread well with a brush and adhere to vertical oven walls during heating.

Veegum-water dispersions ranging from 1 to 4 percent by weight were blended with various amounts of the ternary acetate mixture of Example 1 so that the acetates comprise from 1 to 20 percent of the final blends. These thickened cleaning compositions were tested as before on well-baked lard coatings by heating for 1 hour at 500°F. All preparations containing more than about 2 percent of Veegum adhered well to vertically positioned test surfaces during heating and all those containing more than about 5 percent by weight of the acetate salt mixture cleaned 90 percent or more of the test area.

EXAMPLE 12

A thick brushable paste-like composition with higher pigment content different from the thinner paste of Example 11 was prepared as follows:

|  | % By Wt. |
|---|---|
| Ternary acetate mixture of Example 1 | 10.0 |
| Water | 49.0 |
| Veegum | 1.0 |
| Snowflake No. 301 calcite (325 mesh) | 40.0 |
|  | 100.0 |

The Veegum was first dispersed in 39 parts of the water and the acetates were dissolved in the remaining 10 parts after which the two aqueous mixtures were combined. The powdered calcite was then stirred in forming a thick, smooth paste which was easily brushable onto oven surfaces and adhered especially well to their vertical walls during heating. This preparation was brushed both onto soiled test trays and onto the interior of a household oven which had been heavily soiled by repeated use. The test trays were placed inside the oven which was then heated for 60 minutes at 450°F. On cooling and rinsing with a wet sponge, all of the treated surfaces were found to have been cleaned.

EXAMPLE 13

The following mineral materials were made up into pastes at the indicated ratios with respect to the content of the ternary acetate mixture of Example 1 and with a sufficient quantity of water in each composition to form a thin, easily brushable, paint-like paste. Generally, an amount of water from about one to about three times the weight of solids was used depending on the absorbency of the mineral material. The mineral materials were all finely divided and except where indicated, would pass through a 325 mesh sieve.

| Mineral Material | Ratio of mineral to cleaning salts | % Cleaning Baked Lard 40 min. 410°F |
|---|---|---|
| Feldspar | 3:1 | 100 |
| Pumice | 3:1 | 100 |
| Kaolin | 3:1 | 100 |
| Talc | 3:1 | 100 |
| Amorphous Silica | 3:1 | 75 |
| Magnesium silicate | 3:1 | 65 |
| Silica Sand — 160 mesh | 1:5 | 90 |
| do. | 1:2 | 95 |
| do. | 1:1 | 95 |
| Precipitated Calcium Carbonate USP - light | 2:1 | 90 |
| do. | 4:1 | 30 |
| do. | 6:1 | 10 |
| Precipitated Calcium Carbonate USP — heavy | 2:1 | 100 |
| do. | 4:1 | 100 |
| do. | 6:1 | 90 |

It will be noted that only the light precipitated calcium carbonate and a few of the other materials appear to reduce the cleaning action of the ternary acetate mixture, especially if present in large ratio with respect to the content of salts. This inhibiting action appears to be associated with the absorptive character of the mineral materials which reduces effective contact of the molten salt with the underlying soil. Conversely, many finely divided mineral materials are sufficiently granular in nature and sufficiently inert to the molten cleaning salts to be useful for this purpose, without any limitations that can be easily assigned to their chemical or crystallographic natures.

The compositions of the invention, particularly that of Example 1 has been successfully used to remove various paint coatings in a single application. Among the types of coatings which have been tested with success are white shellac, white baking appliance enamel, soya bean oil based house paint, clear polyurethane wood finish and linseed-tall oil based white enamels among others.

Various modifications of the compositions and method of the invention may be made without departing from the spirit or scope thereof and it should be understood that the invention is to be limited only as defined in the appended claims.

We claim:

1. A method for the removal of a coating or soil containing free or combined organic acid from a surface comprising applying to a surface having a coating or soil containing free or combined organic acid thereon an effective amount of a composition consisting essentially of at least one alkali metal salt of a weak organic acid, heating the said treated surface to a temperature above the melting point of the said alkali metal salts and at a temperature at which the weak organic acid moiety will volatilize and/or decompose and removing the coating or soil residue from the said surface.

2. The method of claim 1 wherein the heating temperature is 250° to 550°F.

3. The method of claim 1 wherein the alkali metal salt of the weak organic acid is a binary or ternary alkali metal acetate mixture.

4. The method of claim 3 wherein the alkali metals are selected from the group consisting of sodium, potassium and lithium.

5. The method of claim 3 wherein there is also present a member selected from the group consisting of an alkali metal glycolate and an alkali metal glycinate.

6. The method of claim 1 wherein a polyhydric alcohol having at least 2 free hydroxy groups is used with the alkali metal salt.

7. A method of removing food soil from oven surfaces comprising applying to the soiled oven surfaces an effective amount of a mixture of at least two alkali metal acetates selected from the group consisting of sodium acetate, lithium acetate and potassium acetate melting below 550°F, heating the said treated oven to 250° to 550°F for a time sufficient to effect reaction with the soil and the alkali metal acetates and removing the soil residue from the said surface.

8. The method of claim 1 wherein the soil or coating is derived from at least one source selected from the group consisting of food, grease, drying oils, shellac, oil based paints and polyurethanes.

9. The method of claim 1 wherein the weak organic acid is at least one member selected from the group consisting of aliphatic and alicyclic carboxylic acids of one to 10 carbon atoms.

10. A method of removing a soil or coating containing free or combined organic acids comprising contacting soil or a coating containing free or combined organic acids with an effective amount of a composition consisting essentially of at least one alkali metal salt of a weak organic acid, heating the treated soil or coating to a temperature above the melting point of the said alkali metal salts and at which the weak organic acid moiety will volatilize and/or decompose and removing the coating or soil residue.

* * * * *